United States Patent
Satish

(10) Patent No.: US 9,058,492 B1
(45) Date of Patent: Jun. 16, 2015

(54) TECHNIQUES FOR REDUCING EXECUTABLE CODE VULNERABILITY

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 522 days.

(21) Appl. No.: 13/027,053

(22) Filed: Feb. 14, 2011

(51) Int. Cl.
- G06F 21/57 (2013.01)
- G06F 21/52 (2013.01)
- G06F 21/50 (2013.01)
- G06F 21/54 (2013.01)
- G06F 21/56 (2013.01)

(52) U.S. Cl.
CPC .............. *G06F 21/577* (2013.01); *G06F 21/52* (2013.01); *G06F 21/50* (2013.01); *G06F 21/54* (2013.01); *G06F 21/566* (2013.01); *G06F 2221/033* (2013.01); *G06F 21/57* (2013.01)

(58) Field of Classification Search
None
See application file for complete search history.

(56) References Cited

U.S. PATENT DOCUMENTS

| | | | |
|---|---|---|---|
| 7,565,551 B2* | 7/2009 | Kirovski | 713/189 |
| 8,051,479 B1* | 11/2011 | Bu et al. | 726/22 |
| 8,307,432 B1* | 11/2012 | Feng | 726/22 |
| 2003/0182572 A1* | 9/2003 | Cowan et al. | 713/200 |
| 2004/0064722 A1* | 4/2004 | Neelay et al. | 713/200 |
| 2005/0108507 A1* | 5/2005 | Chheda et al. | 712/209 |
| 2005/0251570 A1* | 11/2005 | Heasman et al. | 709/224 |
| 2006/0123244 A1* | 6/2006 | Gheorghescu et al. | 713/188 |
| 2006/0191007 A1* | 8/2006 | Thielamay | 726/22 |
| 2006/0282897 A1* | 12/2006 | Sima et al. | 726/25 |
| 2007/0006314 A1* | 1/2007 | Costa et al. | 726/25 |
| 2008/0083030 A1* | 4/2008 | Durham et al. | 726/22 |
| 2008/0263525 A1* | 10/2008 | Berg et al. | 717/131 |
| 2009/0077666 A1* | 3/2009 | Chen et al. | 726/25 |
| 2009/0144828 A1* | 6/2009 | Thomlinson | 726/25 |
| 2009/0282477 A1* | 11/2009 | Chen et al. | 726/22 |
| 2010/0023926 A1* | 1/2010 | Sugawara et al. | 717/120 |
| 2010/0024035 A1* | 1/2010 | Wallace | 726/25 |
| 2010/0205671 A1* | 8/2010 | Milliken et al. | 726/23 |
| 2010/0235913 A1* | 9/2010 | Craioveanu et al. | 726/23 |
| 2010/0333205 A1* | 12/2010 | Bowden et al. | 726/25 |
| 2011/0191848 A1* | 8/2011 | Zorn et al. | 726/22 |
| 2011/0277035 A1* | 11/2011 | Singh et al. | 726/25 |
| 2012/0011493 A1* | 1/2012 | Singh et al. | 717/168 |
| 2012/0030758 A1* | 2/2012 | van den Berg et al. | 726/22 |
| 2012/0151184 A1* | 6/2012 | Wilkerson et al. | 712/36 |
| 2012/0167120 A1* | 6/2012 | Hentunen | 719/320 |
| 2012/0260344 A1* | 10/2012 | Maor et al. | 726/25 |

OTHER PUBLICATIONS

Chen, P., Xing X., Mao, B., Xie L.; "Return-Oriented Rootkit without Returns (on the x86)"; M. Soriano, S. Qing, and J. Lopez (Eds.): ICICS 2010, LNCS 6476, pp. 340-354, 2010. Copyright Springer-Vertlag Berlin Heidelberg 2010.*

Ryan Glenn Roemer, "Finding the Bad in Good Code: Automated Return-Oriented Programming Exploit Discovery," Masters Thesis; University of California, San Diego; 2009; 85 pages.

* cited by examiner

*Primary Examiner* — Andrew Nalven
*Assistant Examiner* — Christopher Ruprecht
(74) *Attorney, Agent, or Firm* — Wilmer Cutler Pickering Hale and Dorr LLP

(57) ABSTRACT

Techniques for reducing executable code vulnerability are disclosed. In one particular exemplary embodiment, the techniques may be realized as a method for reducing executable code vulnerability comprising analyzing a binary file, using at least one computer processor, to identify a vulnerable executable code structure, and configuring the identified executable code structure to reduce vulnerability.

19 Claims, 5 Drawing Sheets

TECHNIQUES FOR REDUCING EXECUTABLE CODE VULNERABILITY

FIELD OF THE DISCLOSURE

The present disclosure relates generally to executable code vulnerability and, more particularly, to techniques for reducing executable code vulnerability.

BACKGROUND OF THE DISCLOSURE

Traditional shell code attacks (e.g., stack and heap based execution) may no longer able to execute on targeted computers due to the No eXecute (NX) bit and/or Data Execution Prevention (DEP) or similar features supported by hardware and/or an Operating System (OS). Additionally, dynamically injected code may be under scrutiny by security vendors and an Operating System when executed from non-executable sections of memory. Newer shell code attacks may be designed to work around these checks. Newer shell code attacks may be designed to execute a complete logical sequence of operations by executing fragments of instruction fragments (from executable code pages) that jump from one fragment to the other with the help of addresses and parameters supplied in a payload. This may differ from traditional shell code where the instructions to be executed were supplied in the payload itself. A payload may thus comprise multiple sets of addresses and optionally, parameters. The byte sequence fragments (forming logical instruction sequences) may abuse x86 binary execution weakness wherein the instruction pointer may be made to jump anywhere (where that starting byte may very well be sub-part of an expected multi-byte instruction or its operands) and as long as the byte and subsequent byte sequences make instructional sense, the processor may execute them.

The shell coders (i.e., hackers) challenge is merely to exploit an application vulnerability and build stack such that instruction pointer can jump to locations that have usable instructions ending with a control transfer instruction where the control transfer address is fetched from the stack (e.g., a pop Executable Instruction Pointer (EIP) effect via return instruction) or moving the stack data to a register and using the register value to do a jmp also known as pop-jmp sequences (like pop x; jmp *x) using any general purpose registers. Such shell code is referred as ROP (Return-oriented-programming) or JOP (Jump-oriented-programming). The step of exploitation that searches for logical sequence of bytes that make instructional sense that end in a control transfer instruction (known as "eggs" or "gadgets") that can be stitched to carry out an operation (known as "omelet" or "gadget") is referred to as "gadget hunting". Note that sequence of instructions ending in a call instruction are typically not considered a useable gadget since the since the return address is governed by the call instruction and not by the attacker. The higher the number of occurrences of such eggs or gadgets, the easier it gets to write shell code against these binaries. Gadgets may be aligned or unaligned byte sequences. An aligned byte sequence may be a sequence of bytes executed in an order intended by the program design (e.g., instructions OA/OB followed by OC/OD and then OE). An unaligned byte sequence may be the execution of bytes in an order other than that intended by the program design (e.g., using a jump to skip instruction OA and execute OB/OC followed by OD/OE). Because shell coders may be able to control a EIP (e.g., by using heap spraying to allow execution of a payload pointing to addresses of desired instructions) traditional safeguards such as the NX bit and scanning for injection codes may not be sufficient. Furthermore, the abundance of unaligned byte sequences may makes it trivial to construct a logical sequence of operations that can be exploited.

In view of the foregoing, it may be understood that there may be significant problems and shortcomings associated with current executable code vulnerability reduction technologies.

SUMMARY OF THE DISCLOSURE

Techniques for reducing executable code vulnerability are disclosed. In one particular exemplary embodiment, the techniques may be realized as a method for reducing executable code vulnerability comprising analyzing a binary file, using at least one computer processor, to identify a vulnerable executable code structure, and configuring the identified executable code structure to reduce vulnerability.

In accordance with other aspects of this particular exemplary embodiment, configuring the identified executable code structure to reduce vulnerability may comprise changing the executable code structure to maintain the same logical outcome while changing a sequence of at least one operation.

In accordance with further aspects of this particular exemplary embodiment, changing a sequence of at least one operation may comprise using a jump.

In accordance with additional aspects of this particular exemplary embodiment, analyzing a binary file, using at least one computer processor, to identify a vulnerable executable code structure may comprise identifying at least one instruction ending with a control transfer structure.

In accordance with additional aspects of this particular exemplary embodiment, analyzing a binary file, using at least one computer processor, to identify a vulnerable executable code structure may comprise identifying executable code performing frequently exploited functionality.

In accordance with additional aspects of this particular exemplary embodiment, code performing frequently exploited functionality may comprise at least one of: code to access a function for downloading a file and code to execute a file.

In accordance with additional aspects of this particular exemplary embodiment, analyzing a binary file, using at least one computer processor, to identify a vulnerable executable code structure may comprise identifying executable code targeted by a hacker toolkit.

In accordance with additional aspects of this particular exemplary embodiment, the techniques may further include analyzing a hacker toolkit to identify targeted executable code.

In accordance with additional aspects of this particular exemplary embodiment, the techniques may further include identifying one or more additional vulnerable executable code structures in the binary file.

In accordance with additional aspects of this particular exemplary embodiment, the techniques may further include configuring the one or more additional identified executable code structure to reduce vulnerability.

In accordance with additional aspects of this particular exemplary embodiment, the techniques may further include determining a priority of vulnerable executable code structures to identify based on a determination that a vulnerable executable code structure comprises at least one of: a frequently exploited sequence of instructions, executable code targeted by a hacker toolkit, aligned bytes, unaligned bytes, executable code that is Address Space Layout Randomization (ASLR) compliant, and executable code that is not Address Space Layout Randomization (ASLR) compliant.

In accordance with additional aspects of this particular exemplary embodiment, the binary file may be analyzed after compilation to identify vulnerable executable code during development of a program.

In accordance with additional aspects of this particular exemplary embodiment, analysis after compilation may be performed by a compiler add-in.

In accordance with additional aspects of this particular exemplary embodiment, the techniques may further include repeating analysis of the binary file subsequent to configuring an identified vulnerable executable code structure to determine if a new vulnerability has been introduced by the configuration.

In accordance with additional aspects of this particular exemplary embodiment, analysis of a binary file may be performed at runtime on address space associated with the binary file to identify vulnerable executable code during runtime.

In accordance with additional aspects of this particular exemplary embodiment, analysis of address space associated with the binary file may be performed by a DLL loaded into the address space.

In accordance with additional aspects of this particular exemplary embodiment, the techniques may further include identifying additional vulnerable executable code associated with a binary file, and providing address space containing null bytes to load a page containing the identified additional vulnerable executable code.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the method.

In another particular exemplary embodiment, the techniques may be realized as an article of manufacture for reducing executable code vulnerability, the article of manufacture comprising at least one non-transitory processor readable medium, and instructions stored on the at least one medium, wherein the instructions are configured to be readable from the at least one medium by at least one processor and thereby cause the at least one processor to operate so as to: analyze a binary file, using at least one computer processor, to identify a vulnerable executable code structure, and configure the identified executable code structure to reduce vulnerability.

In yet another particular exemplary embodiment, the techniques may be realized as a system for reducing executable code vulnerability comprising one or more processors communicatively coupled to a network, wherein the one or more processors are configured to analyze a binary file, using at least one computer processor, to identify a vulnerable executable code structure, and configure the identified executable code structure to reduce vulnerability.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
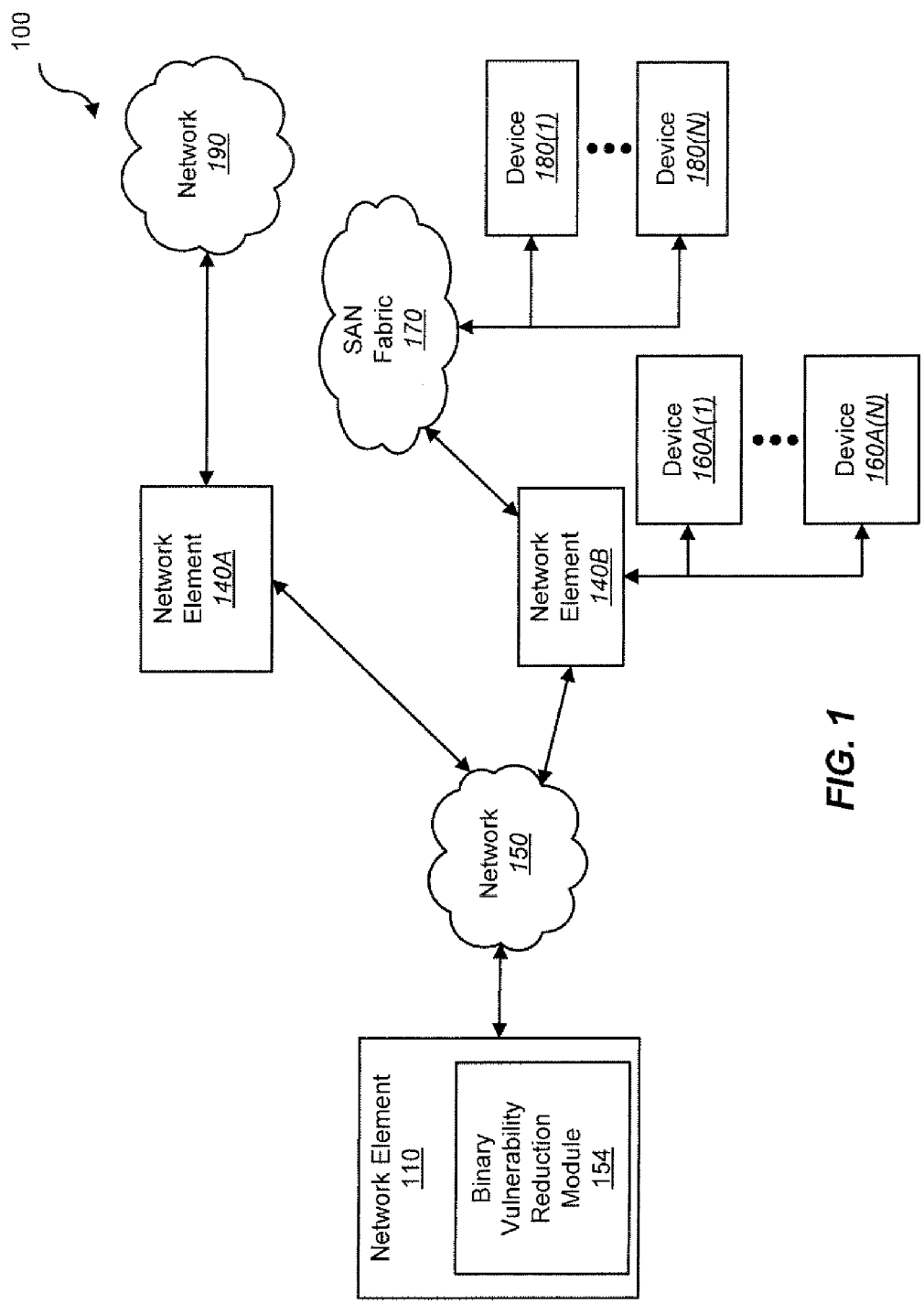
FIG. 1 shows a block diagram depicting a network architecture containing a platform for reducing executable code vulnerability in accordance with an embodiment of the present disclosure.

FIG. 1 shows a block diagram depicting a network architecture 100 for reducing executable code vulnerability in accordance with an embodiment of the present disclosure. FIG. 1 is a simplified view of network architecture 100, which may include additional elements that are not depicted. Network architecture 100 may contain network elements 110 and 140A and 140B (one or more of which may be implemented using computer system 200 shown in FIG. 2). Network element 110 may be communicatively coupled to a network 150. Network element 140A may be communicatively coupled to networks 190 and 150. Network element 140B may be communicatively coupled to storage devices 160A(1)-(N). Network element 140B may be communicatively coupled to a SAN (Storage Area Network) fabric 170. SAN fabric 170 may support access to storage devices 180(1)-(N) by network element 140B, and by network element 110 via network 150.

The description below describes network elements, computers, and/or components of a system and method for reducing executable code vulnerability that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 2:
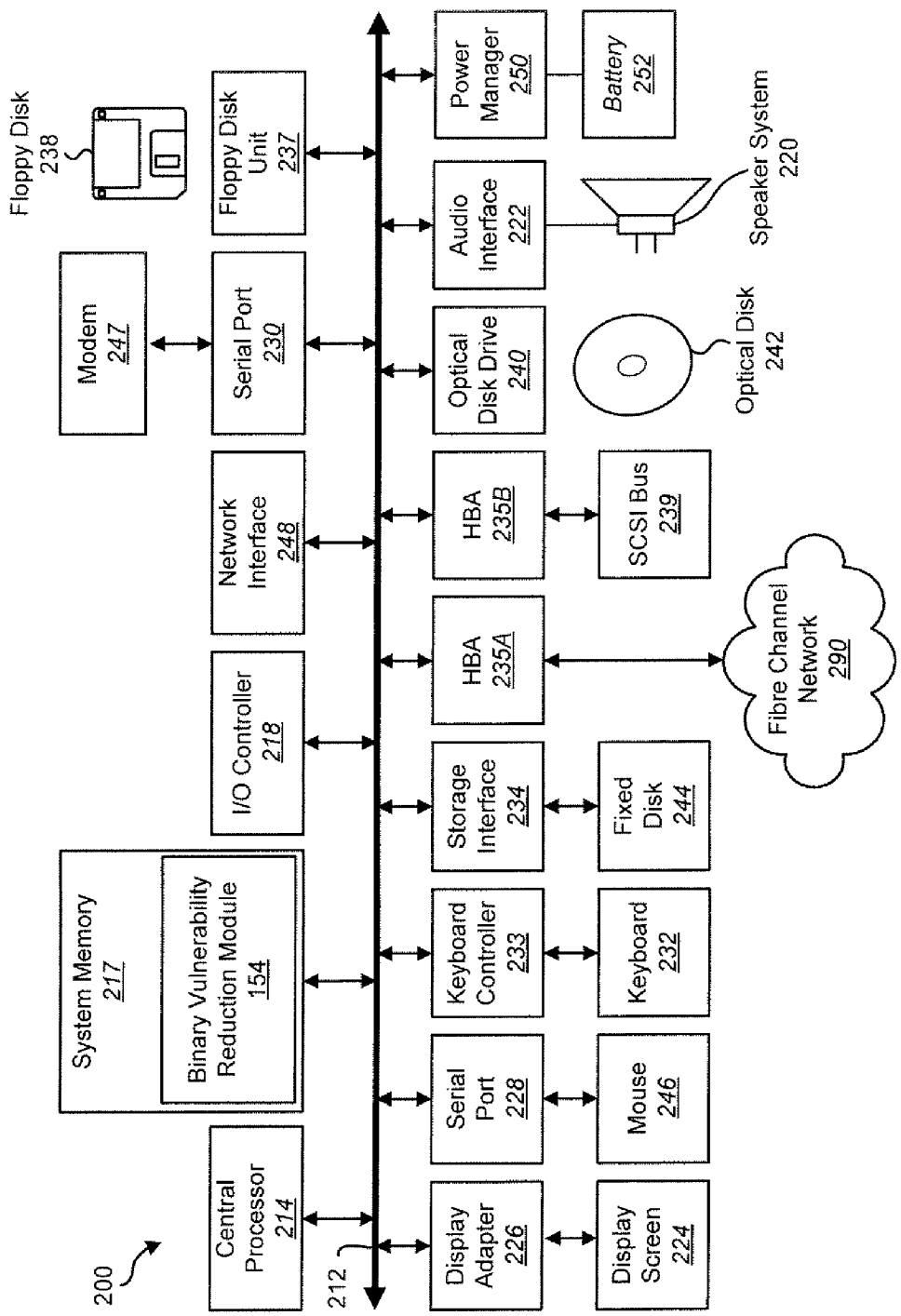
FIG. 2 depicts a block diagram of a computer system in accordance with an embodiment of the present disclosure.

With reference to computer system 200 of FIG. 2, modem 247, network interface 248, or some other method may be used to provide connectivity from network element 110 to network 150. Network element 110 may be able to access information on network elements 140A or 140E using, for example, a web browser or other client software. Such a client may allow network element 110 to access data hosted by network element 140A or 140B or one of storage devices 160A(1)-(N) and/or 180(1)-(N).

Networks 150 and 190 may be local area networks (LANs), wide area networks (WANs), the Internet, cellular networks, satellite networks, or other networks that permit communication between network elements 110 and 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N) and/or 180(1)-(N) may be network accessible storage and may be local, remote, or a combination thereof to network element 140B and SAN Fabric 170. Storage devices 160A(1)-(N) and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N) and/or 180 (1)-(N) may be used for backup or archival purposes.

According to some embodiments, network element 110 may be a device or virtual device coupled via a wireless or wired connection to network 150. Network element 110 may receive data from user input, a database, a file, a web service, and/or an application programming interface.

Network elements 140A and 140B may be gateways, access points, application servers, archival platforms, backup servers, network storage devices, media servers, email servers, document management platforms, enterprise search servers, or other devices communicatively coupled to network 150. Network elements 140A and 140B may utilize one of storage devices 160A(1)-(N) and/or 180(1)-(N) for the storage of application data, backup data, or other data. Network elements 140A and 140B may be hosts, such as an application server, which may process data traveling between network elements 110(N) and a backup platform, a backup process, and/or storage. According to some embodiments, network elements 140A and 140B may be platforms used for backing up and/or archiving data. Network element 140A may be a gateway or an access point on an intranet.

According to some embodiments, network element 110 may be a smartphone, PDA, desktop computer, a laptop computer, a server, another computer, or another device coupled via a wireless or wired connection to network 150. network element 110 may receive data from user input, a database, a file, a web service, and/or an application programming interface.

Network element 110 may contain binary vulnerability reduction module 154. According to some embodiments, binary vulnerability reduction module 154 may identify potential vulnerabilities associated with a binary and/or one or more processes associated with a binary. Vulnerabilities may include exploitable code (e.g., gadgets). Vulnerabilities may be ranked and/or identified according to one or more of: severity, popularity with hackers, targeting of a vulnerability by a hacker tool (e.g., a toolkit), compliance with Address Space Layout Randomization (ASLR) of address space in which vulnerable code is loaded or is going to be loaded, a determination that bytes of vulnerable code are aligned, and a determination that bytes of vulnerable code are unaligned. According to some embodiments, binary vulnerability reduction module 154 may identify vulnerable code in order of a ranking or priority. For example, vulnerabilities most likely to be exploited may be identified first.

According to some embodiments, binary vulnerability reduction module 154 may receive information from an external source setting a priority of vulnerabilities to search for. For example, according to some embodiments a third party service provider may provide information ranking and/or prioritizing vulnerabilities. Binary vulnerability reduction module 154 may receive information about vulnerabilities associated with a particular binary. According to some embodiments, binary vulnerability reduction module 154, another module, or a third party may collect and analyze shell code exploitation history, shell coder tools (e.g., toolkits), and other hacking data. Vulnerable code targeted in past shell code attacks, tool kits, and other hacking data may be identified. The identified vulnerable code may be provided to one or more clients (e.g., binary vulnerability reduction module 154) for use in identifying vulnerabilities. Vulnerability information may enable identification of vulnerabilities in a binary or in address space associated with a process of a binary.

According to some embodiments, binary vulnerability reduction module 154 may contain logic to identify vulnerabilities based on not a known exploitation but potential exploitation. For example, binary vulnerability reduction module 154 may perform one or more searches for sequences of bytes that make instructional sense that end in a control transfer instruction where the control transfer address is fetched from the stack (e.g., a pop Executable Instruction Pointer (EIP) effect via return instruction) or moving the stack data to a register and using the register value to do a jmp also known as pop-jmp sequences (e.g., pop x; jmp *x) using any general purpose registers. A total number of aligned or unaligned sequences of bytes that are exploitable may provide a vulnerability ranking, indicator, or score associated with a binary file or process. According to one or more embodiments, identified vulnerable code may be communicated to a central server, other security clients, and/or a third party security vendor. This may allow identified vulnerable code to be fixed by a vendor and/or may allow additional security clients to prevent exploitation of vulnerable code.

According to some embodiments, a ranking, score, or indicator of vulnerability may be provided to another module, a device, or a user (e.g., an administrator) for exploitation prevention and/or remediation. Additional security measures may be taken based on a security ranking. For example, execution of a binary file with a high vulnerability ranking may be prevented according to some embodiments. As discussed in greater detail below, vulnerable code portions may be fixed without significantly impacting process execution during execution of a process.

According to some embodiments, binary vulnerability reduction module 154 may configure the identified executable code structure to reduce vulnerability. For example, binary vulnerability reduction module 154 may change the executable code structure to maintain the same logical outcome while changing a sequence of at least one instruction (e.g., using a jump to point to instructions in a different address space). Shell coders may analyze a copy of a binary file (e.g., their own copy of a browser Portable Executable (PE) file) and may expect vulnerable code to be located at a particular address. Thus, a modification to executable code structure such that a particular set of instructions is not at a particular address may prevent exploitation of vulnerable code (e.g., break a gadget). Furthermore, modifying the vulnerable code so that it is a sequence of instructions that end in a "call" instruction may result in the executable code not being considered a useful gadget (e.g., vulnerable) since the return address is governed by the call instruction and not by the attacker. For example, a binary file may contain an OA/OB instruction followed by an OC/OD instruction and then an OE instruction. An attacker may expect this sequence and may intend to use instructions OB/OC and then OD/OE. A jump instruction is inserted into the sequence such that sequence in the binary file is now jump to a new address space where an OA/OB instruction followed by an OC/OD instruction and then an OE instruction is contained. The change in address location may break a gadget.

A modification to a sequence of instructions, while not changing a logical behavior of a binary or process, may introduce new vulnerable code or gadgets. Thus, according to some embodiments, a modification to a sequence of instructions to reduce a vulnerability may potentially introduce a new vulnerability. According to some embodiments, binary vulnerability reduction module 154 may analyze a proposed modification to a sequence of instructions to reduce a likelihood of introducing of another vulnerability (e.g., a modification may be prevented if it would introduce a vulnerability that is frequently targeted by a shell code attack kit).

According to some embodiments, binary vulnerability reduction module 154 may repeat vulnerability analysis scans based on a number of criteria including, but not limited to, a calculated vulnerability score based on remaining vulnerable code sequences and vulnerable code sequence characteristics (e.g., aligned or unaligned bytes, a sequence targeted by a shell code kit, a sequence that runs in memory space that is or is not Address Space Layout Randomization (ASLR) compliant, etc.).

According to some embodiments, once all the gadgets have been sequentially broken, hunting vulnerable code or gadgets may be repeated in a new layout of the PE file (with the new instructions). The new gadgets may then be organized and broken. The newly placed instructions can introduce new gadgets. The process of hunting and breaking gadgets may repeated till gadgets can no longer be broken. An alternate embodiment may do "gadget hunting and breaking" only for unaligned sets of gadgets which may minimize the changes needed to a binary. These may be far less compared to sum total of aligned and unaligned gadgets. According to some embodiments, binary vulnerability reduction module 154 may be implemented as a post build step at the time of binary compilation (e.g., a compiler plug-in) or as a separate tool that can be run on a binary. However, changing executable byte sequences in binaries after compilation may break digital signatures or impact some runtime characteristics unanticipated by the vendor.

According to some embodiments, binary vulnerability reduction module 154 may be implemented at runtime (e.g., a DLL may be loaded into process address space at run time that may perform gadget hunting and breaking and restoring/setting page execution properties such that respective process instances are protected). According to some embodiments, this may further be done selectively ONLY for modules that are not ASLR compliant to minimize runtime page changes. ASLR compliant binaries may be to large extent not that easily exploitable since their load addresses are not easily identifiable or the shell code payload has to include "address discovery" functionality. Furthermore, as the process of hunting and breaking gadgets is repeated, the exploitability score may be reduced. The eventual exploitability score may be leveraged by a security policy enforcement agent to apply appropriate level of risk containment policies in case of exploitation.

At some point binary vulnerability reduction module 154 may identify remaining vulnerable code and perform one or more steps to reduce the threat of vulnerable code. For example, location and/or offset characteristics of pages containing remaining vulnerabilities (e.g., gadgets) may be identified by binary vulnerability reduction module 154. Binary vulnerability reduction module 154 may recommend a PE base address that puts these gadgets in addresses containing null bytes. Null bytes in an address may reduce the vulnerability of code because shell code exploits overflowing string buffers may be terminated by the occurrence of a null code (i.e., a null byte may signal the end of a string and terminate the buffer overflow).

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, binary vulnerability reduction module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
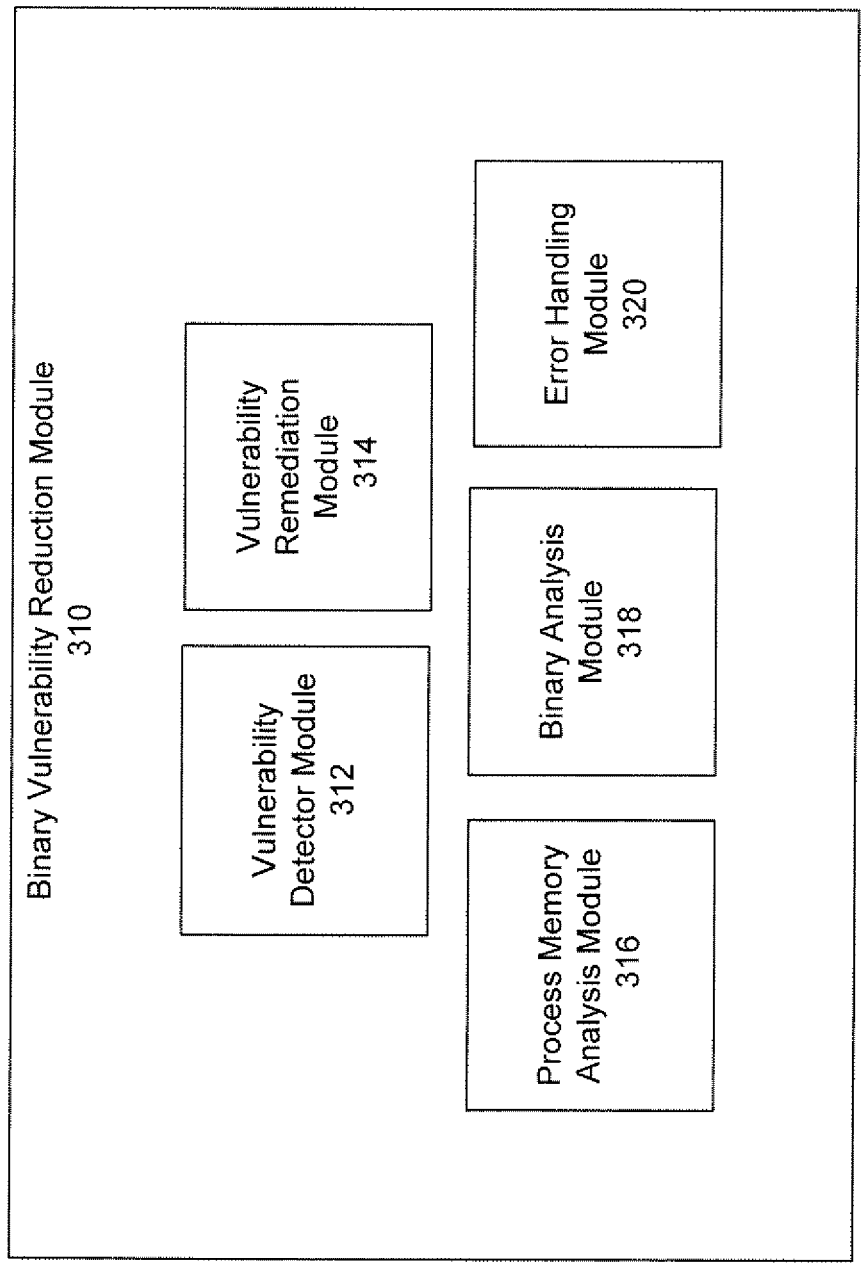
FIG. 3 shows a module for reducing executable code vulnerability in accordance with an embodiment of the present disclosure.

Referring to FIG. 3, there is shown a binary vulnerability reduction module 310 in accordance with an embodiment of the present disclosure. As illustrated, the binary vulnerability reduction module 310 may contain one or more components including vulnerability detector module 312, vulnerability remediation module 314, process memory analysis module 316, binary analysis module 318, and error handling module 320.

Vulnerability detector module 312 may identify potential vulnerabilities associated with a binary and/or one or more processes associated with a binary. Vulnerabilities may include exploitable code (e.g., gadgets). Vulnerabilities may be ranked and/or identified according to one or more of: severity, popularity with hackers, targeting of a vulnerability by a hacker tool (e.g., a toolkit), compliance with Address Space Layout Randomization (ASLR) of address space in which vulnerable code is loaded or is going to be loaded, a determination that bytes of vulnerable code are aligned, and a determination that bytes of vulnerable code are unaligned. According to some embodiments, vulnerability detector module 312 may identify vulnerable code in order of a ranking or priority. For example, vulnerabilities most likely to be exploited may be identified first.

According to some embodiments, vulnerability detector module 312 may receive information from an external source setting a priority of vulnerabilities to search for. For example, according to some embodiments a third party service provider may provide information ranking and/or prioritizing vulnerabilities. Vulnerability detector module 312 may receive information about vulnerabilities associated with a particular binary. According to some embodiments, vulnerability detector module 312, another module, or a third party may collect and analyze shell code exploitation history, shell coder tools (e.g., toolkits), and other hacking data. Vulnerable code targeted in past shell code attacks, tool kits, and other hacking data may be identified. The identified vulnerable code may be provided to one or more clients (e.g., vulnerability detector module 312) for use in identifying vulnerabilities. Vulnerability information may enable identification of vulnerabilities in a binary or in address space associated with a process of a binary.

According to some embodiments, vulnerability detector module 312 may contain logic to identify vulnerabilities based on not a known exploitation but potential exploitation. For example, vulnerability detector module 312 may perform one or more searches for sequences of bytes that make instructional sense that end in a control transfer instruction where the control transfer address is fetched from the stack (e.g., a pop Executable Instruction Pointer (EIP) effect via return instruction) or moving the stack data to a register and using the register value to do a jmp also known as pop-jmp sequences (e.g., pop x; jmp *x) using any general purpose registers. A total number of aligned or unaligned sequences of bytes that are exploitable may provide a vulnerability ranking, indicator, or score associated with a binary file or process. According to one or more embodiments, identified vulnerable code may be communicated to a central server, other security clients, and/or a third party security vendor. This may allow identified vulnerable code to be fixed by a vendor and/or may allow additional security clients to prevent exploitation of vulnerable code.

According to some embodiments, a ranking, score, or indicator of vulnerability may be provided to another module, a device, or a user (e.g., an administrator) for exploitation prevention and/or remediation. Additional security measures may be taken based on a security ranking. For example, execution of a binary file with a high vulnerability ranking may be prevented according to some embodiments.

Vulnerability remediation module 314 may configure the identified executable code structure to reduce vulnerability. For example, vulnerability remediation module 314 may change the executable code structure to maintain the same logical outcome while changing a sequence of at least one instruction (e.g., using a jump to point to instructions in a different address space). Shell coders may analyze a copy of a binary file (e.g., their own copy of a browser Portable Executable (PE) file) and may expect vulnerable code to be located at a particular address. Thus, a modification to executable code structure such that a particular set of instructions is not at a particular address may prevent exploitation of vulnerable code (e.g., break a gadget). Furthermore, modifying the vulnerable code so that it is a sequence of instructions that end in a "call" instruction may result in the executable code not being considered a useful gadget (e.g., vulnerable) since the return address is governed by the call instruction and not by the attacker. For example, a binary file may contain an OA/OB instruction followed by an OC/OD instruction and then an OE instruction. An attacker may expect this sequence and may intend to use instructions OB/OC and then OD/OE. A jump instruction is inserted into the sequence such that sequence in the binary file is now jump to a new address space where an OA/OB instruction followed by an OC/OD instruction and then an OE instruction is contained. The change in address location may break a gadget.

A modification to a sequence of instructions, while not changing a logical behavior of a binary or process, may introduce new vulnerable code or gadgets. Thus, to some embodiments, a modification to a sequence of instructions to reduce a vulnerability may potentially introduce a new vulnerability. According to some embodiments, vulnerability remediation module 314 may analyze a proposed modification to a sequence of instructions to reduce a likelihood of introducing of another vulnerability (e.g., a modification may be prevented if it would introduce a vulnerability that is frequently targeted by a shell code attack kit).

According to some embodiments, vulnerability remediation module 314 may repeat vulnerability analysis scans based on a number of criteria including, but not limited to, a calculated vulnerability score based on remaining vulnerable code sequences and vulnerable code sequence characteristics (e.g., aligned or unaligned bytes, a sequence targeted by a shell code kit, a sequence that runs in memory space that is or is not Address Space Layout Randomization (ASLR) compliant, etc.).

At some point vulnerability remediation module 314 may identify remaining vulnerable code and perform one or more steps to reduce the threat of vulnerable code. For example, location and/or offset characteristics of pages containing remaining vulnerabilities (e.g., gadgets) may be identified by vulnerability remediation module 314. Vulnerability remediation module 314 may recommend a PE base address that puts these gadgets in addresses containing null bytes. Null bytes in an address may reduce the vulnerability of code because shell code exploits overflowing string buffers may be terminated by the occurrence of a null code (i.e., a null byte may signal the end of a string and terminate the buffer overflow).

Process memory analysis module 316 may implement one or more of vulnerability detector module 312 and/or vulnerability remediation module 314 at runtime (e.g., as a DLL loaded into process address space at run time that may perform gadget hunting and breaking and restoring/setting page execution properties such that respective process instances are protected). According to some embodiments, this may further be done selectively ONLY for modules that are not ASLR compliant to minimize runtime page changes. ASLR compliant binaries may be to large extent not that easily exploitable since their load addresses are not easily identifiable or the shell code payload has to include "address discovery" functionality.

Binary analysis module 318 may implement one or more of vulnerability detector module 312 and/or vulnerability remediation module 314 as a post build step at the time of binary compilation (e.g., a compiler plug-in) or as a separate tool that can be run on a binary.

Error handling module 320 may handle one or more errors and/or reporting and logging associated with reducing executable code vulnerability including, but not limited to, errors with vulnerability detection and vulnerability remediation.

Figure 4:
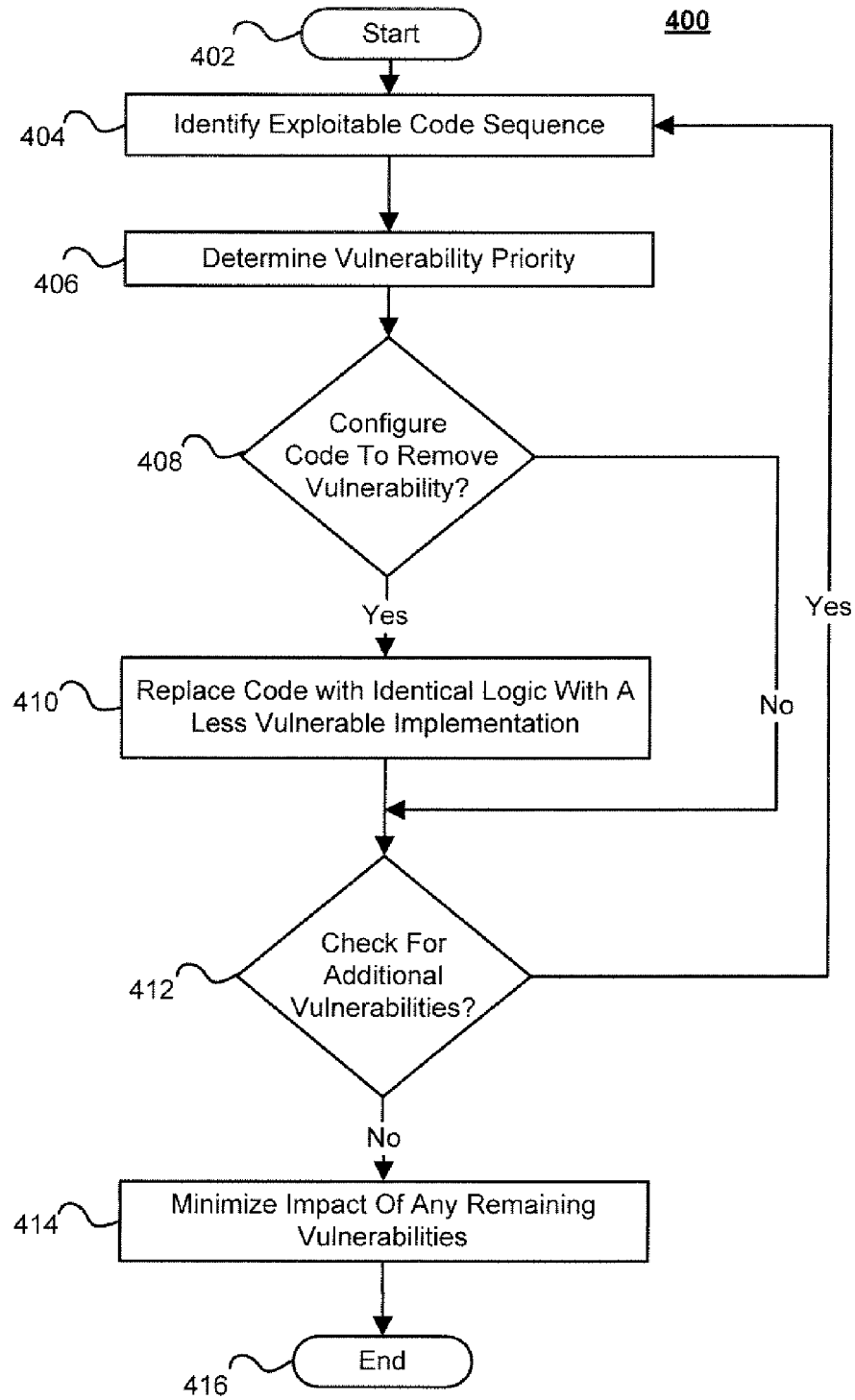
FIG. 4 depicts a method for reducing executable code vulnerability in accordance with an embodiment of the present disclosure.

Referring to FIG. 4, there is depicted a method 400 for reducing executable code vulnerability in accordance with an embodiment of the present disclosure. At block 402, the method 400 may begin.

At block 404, one or more potentially exploitable code sequences may be identified. According to some embodiments information may be received from an external source setting a priority of vulnerabilities to search for. For example, according to some embodiments, a third party service provider may provide information ranking and/or prioritizing vulnerabilities. Information received may be about vulnerabilities associated with a particular binary. A module or a third party may collect and analyze shell code exploitation history, shell coder tools (e.g., toolkits), and other hacking data. Vulnerable code targeted in past shell code attacks, tool kits, and other hacking data may be identified. The identified vulnerable code may be provided to one or more clients for use in identifying vulnerabilities. Vulnerability information may enable identification of vulnerabilities in a binary or in address space associated with a process of a binary.

According to some embodiments, logic may be contained in a device and/or module to identify vulnerabilities based on not a known exploitation but potential exploitation. For example, one or more searches may be performed for sequences of bytes that make instructional sense that end in a control transfer instruction where the control transfer address is fetched from the stack (e.g., a pop Executable Instruction Pointer (EIP) effect via return instruction) or moving the stack data to a register and using the register value to do a jmp also known as pop-jmp sequences (e.g., pop x; jmp *x) using any general purpose registers. A total number of aligned or unaligned sequences of bytes that are exploitable may provide a vulnerability ranking, indicator, or score associated with a binary file or process. According to one or more embodiments, identified vulnerable code may be communicated to a central server, other security clients, and/or a third party security vendor. This may allow identified vulnerable code to be fixed by a vendor and/or may allow additional security clients to prevent exploitation of vulnerable code.

At block 406 priority of one or more identified vulnerabilities may be determined. Vulnerabilities may be ranked and/or identified according to one or more of: severity, popularity with hackers, targeting of a vulnerability by a hacker tool (e.g., a toolkit), compliance with Address Space Layout Randomization (ASLR) of address space in which vulnerable code is loaded or is going to be loaded, a determination that bytes of vulnerable code are aligned, and a determination that bytes of vulnerable code are unaligned.

At block 408 a determination may be made whether to configure code to remove a vulnerability. The determination may be made based on a priority or ranking of a vulnerability, a potential impact of a change (e.g., introduction of new vulnerabilities, impact on a binary signature, impact on an expected runtime characteristic, and/or ASLR compliance of associated address space). If it is determined that the vulnerable code should be configured the method 400 may continue at block 410. If it is determined that the vulnerable code should not be configured the method 400 may continue at block 412.

At block 410 executable code structure may be modified to maintain a same logical outcome while changing a sequence of at least one instruction (e.g., using a jump to point to instructions in a different address space). Shell coders may analyze a copy of a binary file (e.g., their own copy of a browser Portable Executable (PE) file) and may expect vulnerable code to be located at a particular address. Thus, a modification to executable code structure such that a particular set of instructions is not at a particular address may prevent exploitation of vulnerable code (e.g., break a gadget). Furthermore, modifying the vulnerable code so that it is a sequence of instructions that end in a "call" instruction may result in the executable code not being considered a useful gadget (e.g., vulnerable) since the return address is governed by the call instruction and not by the attacker. For example, a binary file may contain an OA/OB instruction followed by an OC/OD instruction and then an OE instruction. An attacker may expect this sequence and may intend to use instructions OB/OC and then OD/OE. A jump instruction is inserted into the sequence such that sequence in the binary file is now jump to a new address space where an OA/OB instruction followed by an OC/OD instruction and then an OE instruction is contained. The change in address location may break a gadget.

At block 412, a determination may be made whether to check for additional vulnerabilities. The determination may be made based on a count of prior scans, whether vulnerabilities are being addressed in a binary file or associated address space, whether associated address space is ASLR compliant, and other factors. If it is determined that additional checks should be performed then the method 400 may return to block 404. If it is determined that additional checks should not be performed then the method 400 may continue at block 414.

At block 414 may identify remaining vulnerable code and perform one or more steps to reduce the threat of vulnerable code. For example, location and/or offset characteristics of pages containing remaining vulnerabilities (e.g., gadgets) may be identified. A PE base address that puts these gadgets in addresses containing null bytes may be recommended. Null bytes in an address may reduce the vulnerability of code because shell code exploits overflowing string buffers may be terminated by the occurrence of a null byte (i.e., a null byte may signal the end of a string and terminate the buffer overflow).

At block 416, the method 400 may end.

Figure 5:
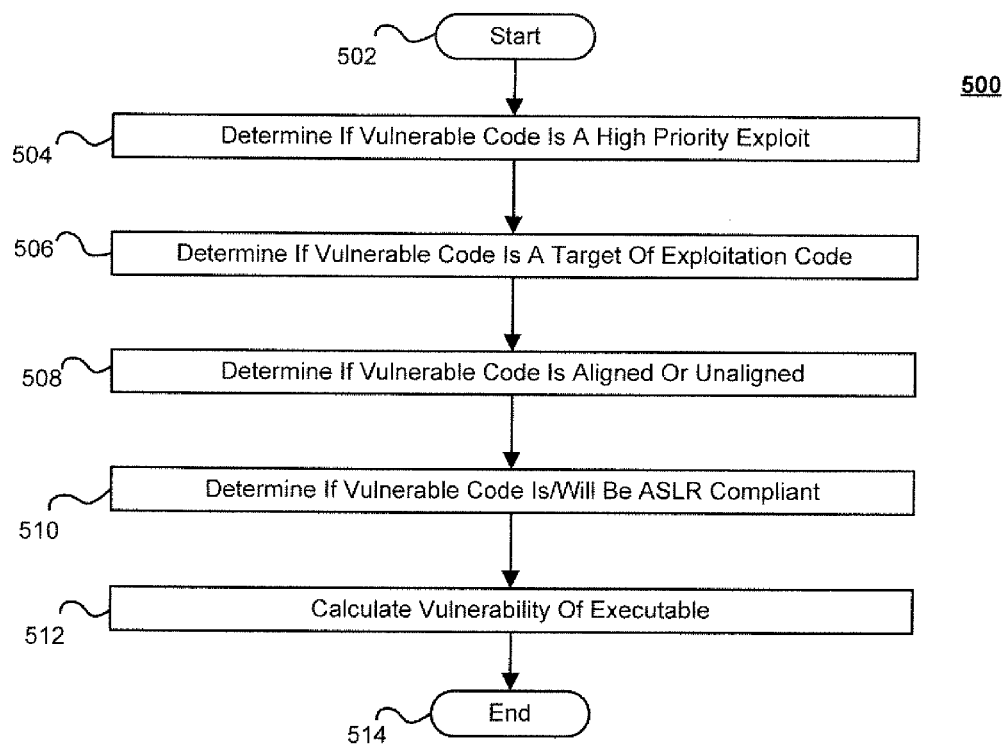
FIG. 5 depicts a method for assessing executable code vulnerability in accordance with an embodiment of the present disclosure.

Referring to FIG. 5, there is depicted a method 500 for assessing executable code vulnerability in accordance with an embodiment of the present disclosure. At block 502, the method 500 may begin.

At block 504, identified vulnerable code may be analyzed to determine if it is a high priority vulnerability (e.g., would be a useful gadget likely to be targeted by a shell code attack).

At block 506, identified vulnerable code may be analyzed to determine if it is a target of exploitation code. For example, vulnerable code may be code identified from mining and/or analysis of shell coder tools, attack kits, blogs, forums, shell code attack history, and other data.

At block 508, identified vulnerable code may be analyzed to determine if it is aligned or unaligned bytes. An aligned byte sequence may be a sequence of bytes executed in an order intended by the program design (e.g., instructions OA/OB followed by OC/OD and then OE). An unaligned byte sequence may be the execution of bytes in an order other than that intended by the program design (e.g., using a jump to skip instruction OA and execute OB/OC followed by OD/OE). According to some embodiments, unaligned bytes may be given a higher priority because of a prevalence of exploitable unaligned bytes as well as shell code tools seeking unaligned bytes.

At block 510, identified vulnerable code may be analyzed to determine compliance with Address Space Layout Randomization (ASLR) of address space in which vulnerable code is loaded or is going to be loaded.

At block 512, one or more of the determinations may be used to calculate a vulnerability ranking, score, and/or indicator. A vulnerability score may be used to determine one or more security measures which may be implemented by a policy. Vulnerability scores may be used to provide notifications and/or alerts to users (e.g., administrators).

At this point it should be noted that reducing executable code vulnerability in accordance with the present disclosure as described above typically involves the processing of input data and the generation of output data to some extent. This input data processing and output data generation may be implemented in hardware or software. For example, specific electronic components may be employed in an reducing executable code vulnerability module or similar or related circuitry for implementing the functions associated with reducing executable code vulnerability in accordance with the present disclosure as described above. Alternatively, one or more processors operating in accordance with instructions may implement the functions associated with reducing executable code vulnerability in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for reducing executable code vulnerability comprising:
analyzing a binary file, using at least one computer processor, to identify a vulnerable executable code structure;
configuring the identified executable code structure to reduce vulnerability, wherein configuring the identified executable code structure comprises reducing vulnerability by modifying a sequence of instructions to end in a call instruction, wherein configuration of the identified executable code to reduce vulnerabilities is performed at runtime by a module loaded into address space of the vulnerable executable code;
identifying additional vulnerable executable code associated with the binary file; and
reducing vulnerability of the additional vulnerable executable code by providing address space containing null bytes to load a page containing the identified additional vulnerable executable code.

2. The method of claim 1, wherein configuring the identified executable code structure to reduce vulnerability comprises changing the executable code structure to maintain the same logical outcome while changing a sequence of at least one operation.

3. The method of claim 2, wherein changing a sequence of at least one operation comprises using a jump.

4. The method of claim 1, wherein analyzing a binary file, using at least one computer processor, to identify a vulnerable executable code structure comprises identifying at least one instruction ending with a control transfer structure.

5. The method of claim 1, wherein analyzing a binary file, using at least one computer processor, to identify a vulnerable executable code structure comprises identifying executable code performing frequently exploited functionality.

6. The method of claim 5, wherein code performing frequently exploited functionality comprises at least one of: code to access a function for downloading a file and code to execute a file.

7. The method of claim 1, wherein analyzing a binary file, using at least one computer processor, to identify a vulnerable executable code structure comprises identifying executable code targeted by a hacker toolkit.

8. The method of claim 1, further comprising:
analyzing a hacker toolkit to identify targeted executable code.

9. The method of claim 1, further comprising:
identifying one or more additional vulnerable executable code structures in the binary file.

10. The method of claim 9, further comprising:
configuring the one or more additional identified executable code structure to reduce vulnerability.

11. The method of claim 1, further comprising:
determining a priority of vulnerable executable code structures to identify based on a determination that a vulnerable executable code structure comprises at least one of:
a frequently exploited sequence of instructions; executable code targeted by a hacker toolkit; aligned bytes; unaligned bytes; executable code that is Address Space Layout Randomization (ASLR) compliant; and executable code that is not Address Space Layout Randomization (ASLR) compliant.

12. The method of claim 1, wherein the binary file is analyzed after compilation to identify vulnerable executable code during development of a program.

13. The method of claim 12, wherein analysis after compilation is performed by a compiler add-in.

14. The method of claim 12, further comprising repeating analysis of the binary file subsequent to configuring an identified vulnerable executable code structure to determine if a new vulnerability has been introduced by the configuration.

15. The method of claim 1, wherein analysis of a binary file is performed at runtime on address space associated with the binary file to identify vulnerable executable code during runtime.

16. The method of claim 14, wherein analysis of address space associated with the binary file is performed by a DLL loaded into the address space.

17. At least one non-transitory processor readable storage medium for storing a computer program of instructions configured to be readable by at least one processor for instructing the at least one processor to execute a computer process for performing the method as recited in claim 1.

18. An article of manufacture for reducing executable code vulnerability, the article of manufacture comprising:
at least one non-transitory processor readable medium; and
instructions stored on the at least one medium;
wherein the instructions are configured to be readable from the at least one medium by at least one processor and thereby cause the at least one processor to operate so as to:
analyze a binary file, using at least one computer processor, to identify a vulnerable executable code structure;
configure the identified executable code structure to reduce vulnerability, wherein configuring the identified executable code structure comprises reducing vulnerability by modifying a sequence of instructions to end in a call instruction, wherein configuration of the identified executable code to reduce vulnerabilities is performed at runtime by a module loaded into address space of the vulnerable executable code;
identify additional vulnerable executable code associated with the binary file; and
reduce vulnerability of the additional vulnerable executable code by providing address space containing null bytes to load a page containing the identified additional vulnerable executable code.

19. A system for reducing executable code vulnerability comprising:
one or more processors communicatively coupled to a network; wherein the one or more processors are configured to:
analyze a binary file, using at least one computer processor, to identify a vulnerable executable code structure;
configure the identified executable code structure to reduce vulnerability, wherein configuring the identified executable code structure comprises reducing vulnerability by modifying a sequence of instructions to end in a call instruction, wherein configuration of the identified executable code to reduce vulnerabilities is performed at runtime by a module loaded into address space of the vulnerable executable code;
identify additional vulnerable executable code associated with the binary file; and
reduce vulnerability of the additional vulnerable executable code by providing address space containing null bytes to load a page containing the identified additional vulnerable executable code.

* * * * *